(12) United States Patent
Becker (10) Patent No.: US 9,881,169 B2
(45) Date of Patent: Jan. 30, 2018

(54) MALWARE-PROOF DATA PROCESSING SYSTEM

(71) Applicant: Friedhelm Becker, Waddewarden (DE)

(72) Inventor: Friedhelm Becker, Waddewarden (DE)

( * ) Notice: Subject to any disclaimer, the term of this patent is extended or adjusted under 35 U.S.C. 154(b) by 193 days.

(21) Appl. No.: 14/783,303

(22) PCT Filed: Mar. 27, 2014

(86) PCT No.: PCT/EP2014/056190
§ 371 (c)(1),
(2) Date: Oct. 8, 2015

(87) PCT Pub. No.: WO2014/166753
PCT Pub. Date: Oct. 16, 2014

(65) Prior Publication Data
US 2016/0070916 A1    Mar. 10, 2016

(30) Foreign Application Priority Data

Apr. 9, 2013 (DE) ........................ 10 2013 005 971

(51) Int. Cl.
*G06F 12/14* (2006.01)
*G06F 21/62* (2013.01)
(Continued)

(52) U.S. Cl.
CPC .......... *G06F 21/62* (2013.01); *G06F 12/1483* (2013.01); *G06F 13/122* (2013.01);
(Continued)

(58) Field of Classification Search
CPC ...... G06F 21/56; G06F 21/62; G06F 12/1483; G06F 13/122; G06F 21/57; G06F 2221/034; G06F 2212/1052
(Continued)

(56) References Cited

U.S. PATENT DOCUMENTS 6,112,263 A    8/2000  Futral
7,000,092 B2   2/2006  Gehman et al.
(Continued)

FOREIGN PATENT DOCUMENTS

DE    19950255 A1    6/2000
EP     2428910 A2    3/2012

OTHER PUBLICATIONS

International Preliminary Report on Patentability dated Oct. 13, 2015 in International Application No. PCT/EP2014/056190.
(Continued)

*Primary Examiner* — Jasmine Song
(74) *Attorney, Agent, or Firm* — Panitch Schwarze Belisario & Nadel LLP (57) ABSTRACT

A data processing system may have a strict separation of processor tasks and data categories, wherein processor tasks are separated into software loading and initialization (loading processor) and data processing (main processor) and data categories are separated into address data, instructions, internal function data, target data of the main processor and target data of the loading processor. In this way, protection is provided against malware, irrespective of the transmission medium and of the type of malware, and also against future malware and without performance losses in the computer system.

16 Claims, 7 Drawing Sheets

(51) Int. Cl.
    *G06F 13/12* (2006.01)
    *G06F 21/56* (2013.01)
    *G06F 21/57* (2013.01)
(52) U.S. Cl.
    CPC .............. *G06F 21/56* (2013.01); *G06F 21/57* (2013.01); *G06F 2212/1052* (2013.01); *G06F 2221/034* (2013.01)
(58) Field of Classification Search
    USPC ........................................................ 711/104
    See application file for complete search history.

(56) References Cited

U.S. PATENT DOCUMENTS

| | | | |
|---|---|---|---|
| 8,117,642 B2 | 2/2012 | Covey et al. | |
| 2006/0010264 A1* | 1/2006 | Rader | ................ B65H 35/0013 710/23 |

OTHER PUBLICATIONS

International Search Report and Written Opinion dated Sep. 4, 2014 in International Application No. PCT/EP2014/056190.

* cited by examiner

MALWARE-PROOF DATA PROCESSING SYSTEM

CROSS-REFERENCE TO RELATED APPLICATIONS

This application is a Section 371 U.S. National Stage Filing of International Application No. PCT/EP2014/056190, filed Mar. 27, 2014, which was published in the German language on Oct. 14, 2014, under International Publication No. WO 2014/166753 A1, which claims priority to German Patent Application No. 10 2013 005 971.2.9, filed on Apr. 9, 2013, the disclosures of which are incorporated herein by reference.

The present invention relates to a data processing system.

Electronic data processing systems are complex structures for solving data processing tasks. They consist of subsystems, only the interaction of which enables the tasks to be fulfilled. Important sub-systems are: a) the instrumental components: hardware, software, firmware (microprogramming), orgware (organisational knowledge) and b) the components on the application side: tasks, users, operating and system maintenance.

Conventional computer systems are based on the principle of Von Neumann architecture.

The principal idea of Von Neumann hardware architecture is that there is a common memory for software and data, whereby the software is capable of changing itself. The architecture is based on five functional units: a control unit, an arithmetic logic unit, a memory, an input unit and an output unit. The random access memory and the main processor, which contains the control unit and arithmetic logic unit, form the central processing unit. The main processor retrieves information from the random access memory into its own registers and back via a bus system, which consists of a bi-directional instruction bus and a bi-directional operand bus. In fact, both buses retrieve information, which is interpreted as instructions or operands depending on the bus concerned. However, the retrieved data are determined by their respective address. Both buses usually have access to the same random access memory areas. Furthermore, in the case of conventional computers instructions and operands are stored without mutual separation, so that operands like instructions can be retrieved by each of the two buses.

In this day and age, where the use of computer systems ubiquitously dominates everyday human life, guaranteeing security when using computer systems is an essential factor.

So-called malware in the form of computer programs can execute functions within the computer system which are unwanted by the user and are possibly malicious. Malware benefits from the hardware architecture of commercially available computers in as much as it gets into the random access memory areas in the form of operands or modified instructions, and from there via the instruction bus reach the processors, in which they cause their malicious effect.

According to the prior art, the protection of computer systems against malware is effected by using detection software, which recognises such malware and deals with it in an appropriate manner. This method has the fundamental disadvantage that it continually lags behind the creations of the producers of malware, since new malware firstly has to be identified in order to be able to program a remedy which is finally installed and integrated. Furthermore, this detection software requires resources which are no longer available for the originally intended use of the computers.

An optimisation of microprocessors is known from the patent specification DE 199 50 255 B4 which enables the throughput of the CPU to be improved by improving the efficiency of the use of the buses. Data and instructions are handled separately both during access and during storage. Hardware-assured security against malware is not disclosed.

U.S. Pat. No. 7,000,092 B2 discloses a reference system for the interaction of a plurality of processors. Hardware-assured security against malware is also not provided here.

Hardware is known from the patent specification U.S. Pat. No. 8,117,642 B2 which differentiates between a mode which is privileged and regarded as safe and a mode which is not privileged and is potentially unsafe, wherein instructions at the level of routines are explicitly and permanently allocated to these modes. However, absolute protection of data which require protection is not provided when the processor is running in the potentially unsafe mode.

It is an object of the present invention to provide a data processing system such that the underlying hardware architecture protects against the effects of malware.

This object may be achieved by a data processing system having various features recited in the accompanying claims.

According to this, a data processing system having at least one main processor, at least one permanent data memory and at least one random access memory, wherein the at least one main processor is connected to at least one input/output hardware unit (interface), and wherein the at least one main processor communicates with the at least one random access memory via at least one instruction bus and via at least one operand bus and separately from these communicates bi-directionally with the at least one permanent data memory, is provided with at least one loading processor which communicates bi-directionally with at least one permanent software memory and at least one external software memory and which communicates with the at least one random access memory via at least one instruction bus and via at least one operand bus separately and independently from the at least one main processor, wherein the communication between the at least one main processor and the at least one random access memory takes place via the at least one instruction bus and the at least one operand bus, the communication between the at least one loading processor and the at least one random access memory takes place via the at least one instruction bus and the at least one operand bus, both the communication between the at least one main processor and the at least one input/output hardware unit as well as the at least one permanent data memory and the communication between the at least one loading processor and the at least one external software memory as well as the at least one permanent software memory are controlled via access attributes. The processor tasks are strictly separated due to the presence of the main processor and the loading processor which is separate from it.

At the same time, provision is preferably made for data to be categorised in the at least one random access memory according to data categories, wherein different access attributes are defined as a function of the categories, namely main processor access attributes for the at least one main processor and loading processor access attributes for the at least one loading processor, and wherein data of the same data categories have the same main processor access attributes for access by the at least one main processor and the same loading processor access attributes for access by the at least one loading processor. In this way, the separation of processor tasks is continued at the data level, in which certain data categories are allocated to the different processor tasks with access attributes, wherein the access attributes of the main processor and loading processor can be different in the same data category.

It is advantageous if at least one separate random access memory is provided for each data category. In this way, the separation is also physically made, which also supports the strict separation.

Preferably, the following data categories are provided: address data, instructions, internal function data, target data of the at least one main processor (main processor target data), target data of the at least one loading processor (loading processor target data).

In order to protect the computer system against malware, the separation of data categories and processor tasks is controlled by main processor access attributes and loading processor access attributes. Preferably, the at least one main processor has no access to the at least one permanent software memory, has access to the at least one random access memory for instructions via the at least one instruction bus and this is restricted to "read" access mode, has access to the at least one random access memory for address data via the at least one operand bus and this is restricted to "read" access mode, has access to the internal function data via the at least one operand bus and this takes place in "write" and/or "read" access modes, and has access to the main processor target data via the at least one operand bus and this takes place in "write" and/or "read" access modes, and has no access to the loading processor target data of the at least one loading processor.

Furthermore, preferably the at least one loading processor has access to the at least one external software memory and this is restricted to "read" access mode, and has access to the at least one permanent software memory and this takes place in "write" and/or "read" access modes, has access to the at least one random access memory for instructions via the at least one operand bus and this is restricted to "write" access mode, has access to the at least one random access memory for instructions via the at least one instruction bus and this is restricted to "read" access mode, has access to the at least one random access memory for the loading processor target data, address data and internal function data via the at least one operand bus and this takes place in "write" and/or "read" access modes, and has no access to the main processor target data of the at least one main processor.

In order to protect the computer system against the introduction of malware by media, provision is advantageously made for the data processing system to have a media processor which via at least one instruction bus and at least one operand bus in each case communicates bi-directionally with at least one separate random access memory for media data, wherein the media processor has its own permanent media data memory with which it communicates bi-directionally, and wherein the media processor is connected to its own input/output hardware unit (interface). As a result of the main processor accessing the media data bi-directionally via the operand bus, the computer is able to safely execute software made available by media.

The data processing system according to the invention can be used regardless of the size of the computer system. It is advantageous that, when more than one main processor is present, the main processors can be used independently from one another, wherein each main processor communicates with a memory for main processor target data which is permanently allocated to it, to which the other main processors respectively have no access, and wherein all main processors have an additional common random access memory for common target data for controlled data transfer between the main processors. A "red-black separation", for example, can be accomplished by means of this arrangement.

However, it can also be preferable that, when more than one main processor is present, the main processors are used independently from one another, wherein all main processors have a common random access memory for main processor target data with the "read" and "write" access attributes. Here, the common random access memory for common target data for controlled data transfer is not present and is replaced by a commonly used random access memory for all main processor target data.

In addition, provision is advantageously made for an external reading device to be provided for reading software into the random access memory and for the reading device to be controlled by the at least one loading processor, wherein the at least one loading processor forms an interface with the external reading device for software, this interface being physically set up in such a way that conventional reading devices for data carriers cannot be operated with it, so that unintentional loading of software is prevented. An external reading device can be desirable, for example, in organisations in which the same computing environment in terms of software is required.

Furthermore, it is preferable for the loading processor to be arranged in an external loading device for loading software into the random access memory. This arrangement enables software to be transferred directly from the loading device to the random access memory for software according to the Direct Memory Access (DMA) process or similar processes. This is, for example, advantageous for computer systems having a small number of software loading instances, in which the external loading device is connected to the computer system exclusively for this purpose.

In the data processing system according to the invention, it can be preferable for the data categories internal function data and loading processor target data to be allocated to the same physical random access memory.

A computer program is advantageously provided which processes outputs from program generation tools, wherein the processing takes place in such a way that the data categories are created and produced as data segments which can be processed by the data processing systems according to the invention.

In addition, a computer program, which processes programs that are executable in Von Neumann architecture and/or Harvard architecture, is preferably provided, wherein the processing takes place in such a way that the data categories are created and produced as data segments which can be processed by the data processing systems according to the invention.

Preferred embodiments of the invention are explained in more detail below with the aid of the drawings. In the drawings, the same function elements are provided with the same reference numbers.

Figure 1:
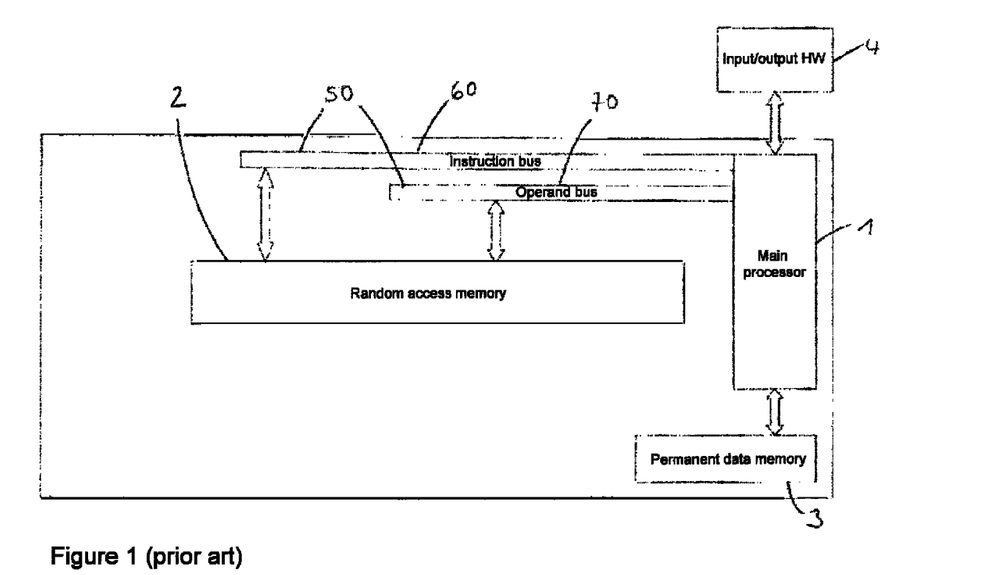
FIG. 1: shows a block diagram of Von Neumann hardware architecture.

FIG. 1 shows the prior art in the form of a block diagram. The illustrated Von Neumann hardware architecture consists of a main processor 1, a random access memory 2, a permanent data memory 3, input/output hardware 4 and a bus system 50. A distinction is made in the bus system 50 between the instruction bus 60, which transports the instructions, and the operand bus 70, which transports the operands. The main processor 1 communicates with the random access memory 2 bi-directionally via the bus system 50. In addition, the main processor 1 has bi-directional access to the permanent data memory 3.

Figure 2:
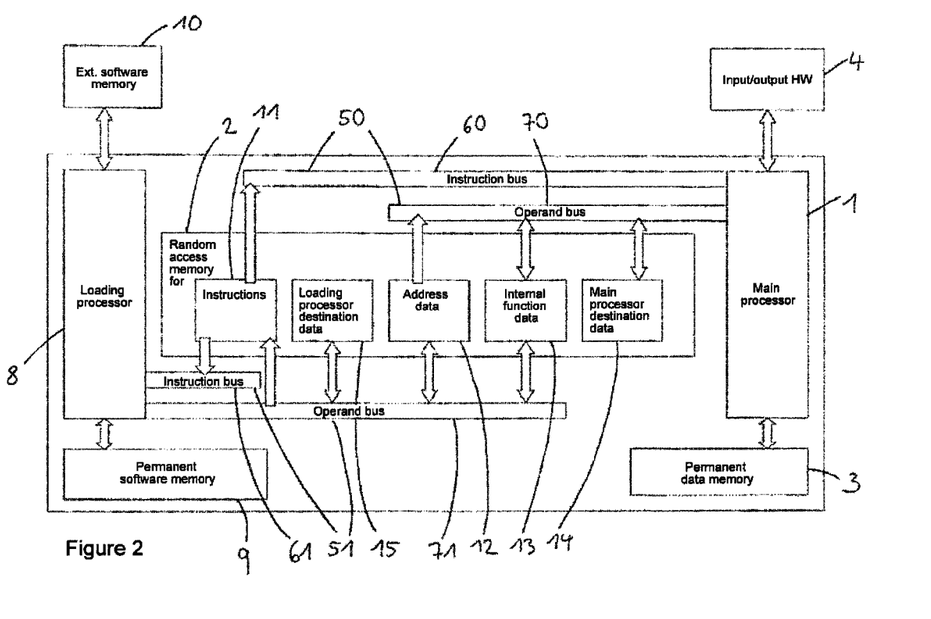
FIG. 2: shows a block diagram of an arrangement according to the invention with a separate internal loading processor.

FIG. 2 shows an embodiment of the data processing system according to the invention. In addition to a main processor 1 which communicates bi-directionally with an input/output hardware unit 4 and a permanent data memory 3, a second processor, the loading processor 8, is present. The loading processor 8 communicates bi-directionally with its own permanent memory 9 for storing software and with its own external software memory 10. Both processors are connected via a bus system 50, 51 respectively to a random access memory 2. The bus systems 50, 51 each comprise an instruction bus 60, 61 respectively and an operand bus 70, 71 respectively, which connect the respective processor 1, 8 to the random access memory 2. The random access memory 2 is divided into five physical random access memory units. The following data categories are stored in these: instructions 11, address data 12, internal function data 13, target data for the main processor 14 and target data for the loading processor 15. The main processor 1 and the loading processor 8 have different access rights to the random access memory units corresponding to the data categories. The bus structure 50, 51 with the definitions of the data categories and the access rights is described in more detail below.

The first data category is that of the instructions 11. Instructions 11 are the smallest software components which are to be executed by the processors. They are accessible in read-only mode via their instruction bus 60, 61 for all processors dependent on them. Only the loading processor 8 is allowed to have write access to instructions 11 via its operand bus 71, which is a requirement for loading software. Instructions 11 are produced and loaded within the framework of the generation of software under quality and configuration control.

A further data category is that of the address data 12. Address data 12 serve to link values to the addresses of the associated software functions. They are accessible in read-only mode via their operand bus 70 for all processors 1 dependent on them. Only the loading processor 8 is allowed to have write access to address data 12 via its operand bus 71, which is a requirement for loading software. Address data 12 are produced and loaded within the framework of the generation of software under quality and configuration control.

A further data category is that of the internal function data 13. Internal function data are the part of the software which serve to provide a controlled functional sequence. They are accessible in read and write mode via their operand bus 70, 71 for all processors 1, 8 dependent on them. Internal function data 13 are produced and loaded within the framework of the generation of software under quality and configuration control.

A further category is that of the target data for the main processor 14. These data are not part of the program function, but program functions affect these data. They are accessible in read and write modes via their operand bus 70 for the main processor 1 and additional processors. The loading processor 8 has neither read nor write access to these target data 14. Thereby, target data 14 are prevented from being able to in this way get into memory areas that are reserved for instructions 11 or address data 12.

In addition, the random access memory 2 comprises the category target data for the loading processor 15. Target data for the loading processor 15 are data which software functions have an effect on, but which are not part of the software function. They are only accessible in read and write modes for the loading processor 8 via its operand bus 71. The main processor 1 has no access to these target data 15.

The loading processor 8 is hierarchically subordinate to the main processor 1. Its instruction bus 61 and operand bus 71 are separate and independent from those of the main processor 60, 70. It has the following tasks to fulfil:
 copying software from the external software memory 10 to the permanent memory for software 9,
 copying software from the permanent software memory 9 into the random access memories 2 for instructions 11, internal function data 13 and address data 12
 and converting software structures possibly present, so that compatibility with the system architecture can be obtained.

The system environment determines the performance of the loading processor 8. For systems with a small number of software loading procedures, e.g. embedded systems, the loading processor 8 may be an external component which is only connected to the system for this purpose.

The main processor fulfils all other designated computer tasks. Its instruction bus 60 and operand bus 70 are separate and independent from those of the loading processor 61, 71. It has no access to the permanent memory for software 9. Its access to the random access memory 2 for instructions 11 is restricted to read-only via the instruction bus 60. Its access to the random access memory 2 for address data 12 is restricted to read-only via the operand bus 70. Its access to the random access memory 2 for its target data 14 is read and write via the operand bus 70. It has no access to the target data of the loading processor 15.

The main processor 1 is not involved in the intended transfer of software to be executed. However, the software which is currently processed as part of software development measures belongs to the target data category.

When carrying out loading functions, it is possible that competing accesses occur from the loading processor 8 and the main processor 1 to the random access memory 2 for internal function data 13 and address data 12. Due to the strict separation of data categories, this situation cannot result in the malware being spread. Furthermore, access to the same data is already prevented by the allocation of different addresses during the software generation and the loading process.

Data of the target data for the main processor 1 category are exclusively stored in the permanent memory for target data 3. Only the main processor 1 has access to these data. The loading processor 8 has neither read nor write access to these data.

Data of the instructions 11, address data 12 and internal function data 13 categories are stored in the permanent memory for software 9. The loading processor 8 can have read and write access to these data. No other processor is allowed to access this memory. Access to this memory 9 takes place exclusively in connection with the installation and initialisation of software. The permanent software memory 9 is written to exclusively for the purpose of software installation.

Figure 3:
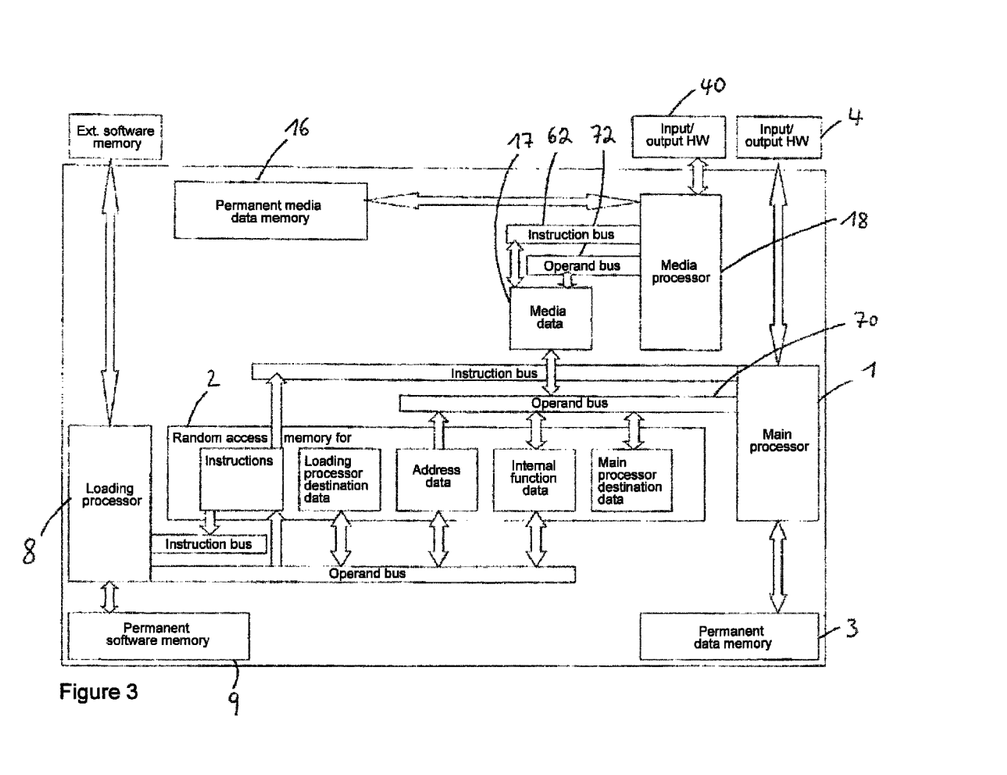
FIG. 3: shows a block diagram of the arrangement according to the invention with an additional media processor.

The embodiment shown in FIG. 3 shows as the main constituent the elements and the arrangement thereof according to FIG. 2. Additionally, the structure has a permanent media data memory 16, a media data random access memory 17, a media data bus system with instruction and operand buses 62, 72, its own input/output hardware 40 and a media processor 18 for processing data and for executing software which are made available via media. The media processor 18 communicates bi-directionally with the input/output hardware 40 and has no access to the other memories 2, 3, 9 present. Only the media processor 18 allocated to the media and the main processor 1 have access to the media data random access memory 17. Furthermore, only the media processor 18 allocated to the media has access to the permanent media data memory 16. The computer system is therefore able to safely execute software, which is made available by the media, by means of a separate media processor 18.

Figure 4:
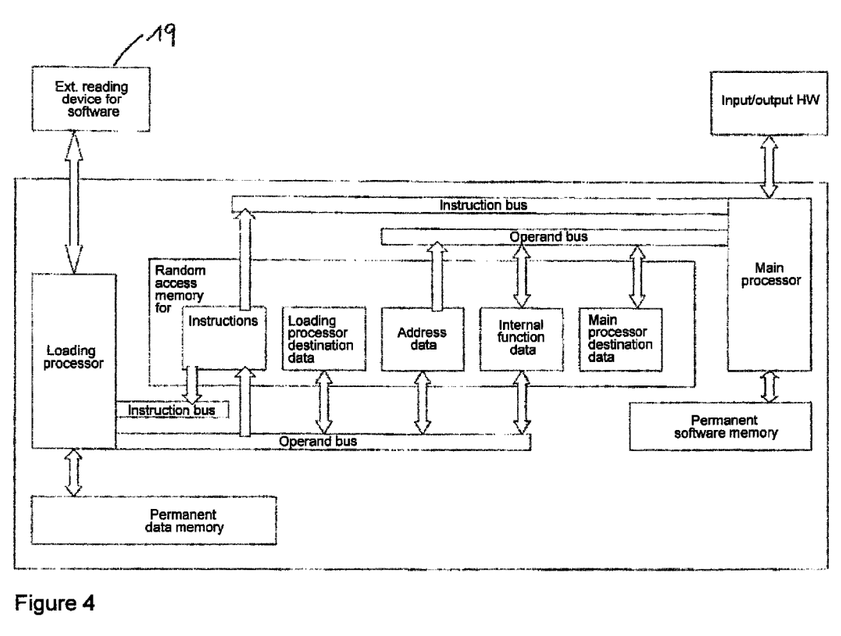
FIG. 4: shows a block diagram of an arrangement according to the invention with an external reading device for software.

FIG. 4 essentially shows the block diagram from FIG. 2, wherein the external software memory has been replaced by an external reading device for software 19. The interface to the external reading device for software 19 is physically set up in such a way that conventional reading devices for data carriers cannot be operated with it, so that unintentional loading of software is prevented. Applications of this invention are found, for example, in embedded systems and in organisations in which the same computing environment in terms of software is required.

Figure 5:
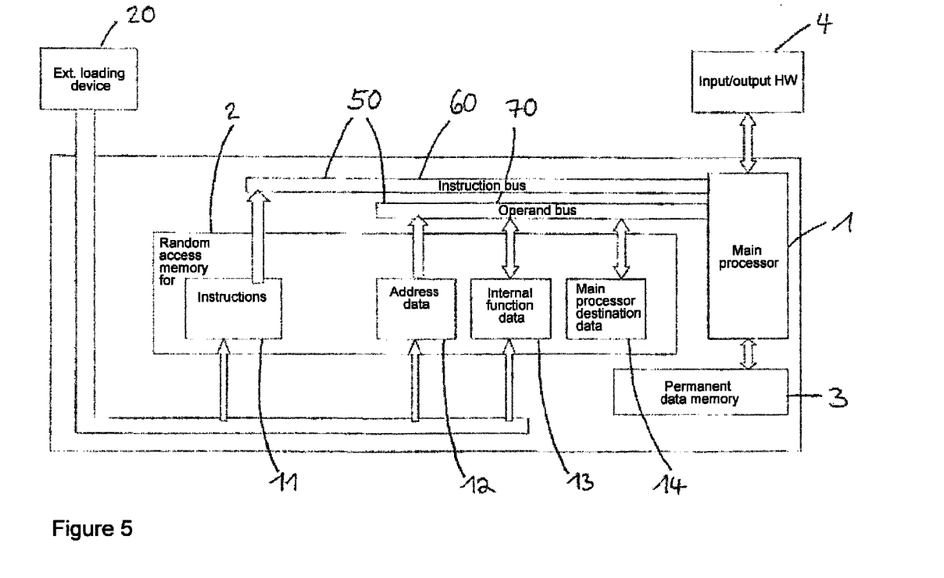
FIG. 5: shows a block diagram of an arrangement according to the invention with an external loading device.

The embodiment in FIG. 5 shows next to a main processor 1, which communicates bi-directionally with an input/output hardware unit 4 and a permanent data memory 3, a random access memory 2 which is connected via a bus system 50 to the main processor 1 and an external loading device 20 for loading software. The bus system 50 comprises an instruction bus 60 and an operand bus 70 for communication between the main processor 1 and the random access memory 2. The random access memory 2 is divided into four physical random access memory units. The following data categories are stored in them: instructions 11, address data 12, internal function data 13 and target data for the main processor 14. The main processor 1 and the external loading device 20 have different access rights to the random access memory units corresponding to the data categories. The external loading device 20 has exclusive write access to the instructions 11, address data 12 and internal function data 13. The main processor 1 reads via the instruction bus 60 the instructions 11 and via the operand bus 70 the address data 12 of the random access memory 2. In addition, the main processor 1 can access the internal function data 13 and the target data of the main processor 14 of the random access memory 2 both in read and write modes.

The external loading device 20 constitutes a separate processor for loading software, wherein the computer system equipped in this way does not have its own loading processor and memory allocated to it. Hence, it is not able to read software directly from external software memories or configure software during operation. In this exemplary embodiment, an external device is required to load software, which has a corresponding physically distinctive interface. Applications of this exemplary embodiment are found, for example, in systems where the software is not configured during operation.

Figure 6:
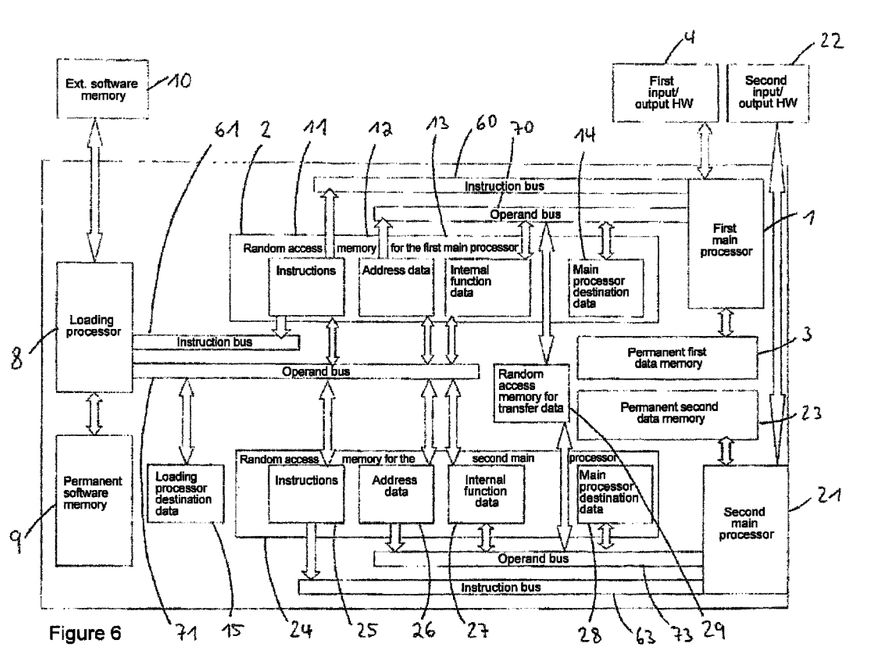
FIG. 6: shows a block diagram of an arrangement according to the invention with two main processors which are independent from one another, wherein each main processor communicates with a memory for main processor target data which is permanently allocated to it and both main processors exchange data via a common random access memory.

The exemplary embodiment represented in FIG. 6 shows a first and a second main processor 1, 21 which function independently from one another and which in each case have a fixed set of allocated function elements. The respective main processor 1, 21 is connected bi-directionally to the respective input/output hardware unit 4, 22 and to the respective permanent data memory 3, 23. In addition, each main processor 1, 21 has a bus system consisting of instruction and operand buses 60, 63, 70, 73, via which it communicates with the respective random access memory 2, 24. The respective random access memory 2, 24 is divided into four random access memory areas which are physically separate from one another. The areas are divided into instructions 11, 25, address data 12, 26, internal function data 13, 27 and target data of the respective main processor 14, 28, dependent on the access rights of the respective main processor 1, 21 and a loading processor 8 present. The loading processor 8 communicating bi-directionally with an external software memory 10 and a permanent software memory 9 has a bus system consisting of instruction and operand buses 61, 71. Furthermore, an additional random access memory is provided for the target data of the loading processor 15 and for transfer data 29. The access rights of the function elements are explained in more detail below. The respective main processor 1, 21 has read access via the respective instruction bus 60, 63 to the instructions 11, 25 and read access via the operand bus 70, 73 to the address data 12, 26 of the respective random access memory 2, 24. The respective main processor 1, 21 has both read and write access to the internal function data 13, 27 and the target data of the respective main processor 14, 28 in the respective random access memory 2, 24. Both main processors 1, 21 bi-directionally access the random access memory for transfer data 29 via their respective operand bus 70, 73. The loading processor 8 has write access via the operand bus 71 to the instructions 11 of the first main processor 1 and the instructions 25 of the second main processor 21. The instructions 11 of the first main processor 1 are read by the instruction bus 61 of the loading processor 8. The address data 12, 26 and the internal function data 13, 27 of the respective main processor 1, 21 and the target data of the loading processor 15 are bi-directionally accessed via the operand bus 71 of the loading processor 8. This double-processor version enables, for example, data to be transferred securely between networks with different security classifications. The computer systems usually have access to both networks, namely by software which is especially structured and thoroughly tested for this purpose, in order to prevent unintended or unauthorised data transfers. The same problem arises with the control of effectors on the basis of inputs of different sensors. Here, in addition to the possible "infection" with malware among the sub-systems, which can be avoided by applying the data processing system according to the invention, it is a question of preventing by hardware means situations which can disrupt the control algorithm. These negative effects can be prevented by assigning the sensor and effector functions to a separate processor in each case, wherein the respective processors have accesses, which are uniquely defined and implemented in the hardware, to their own and to common data in each case.

Figure 7:
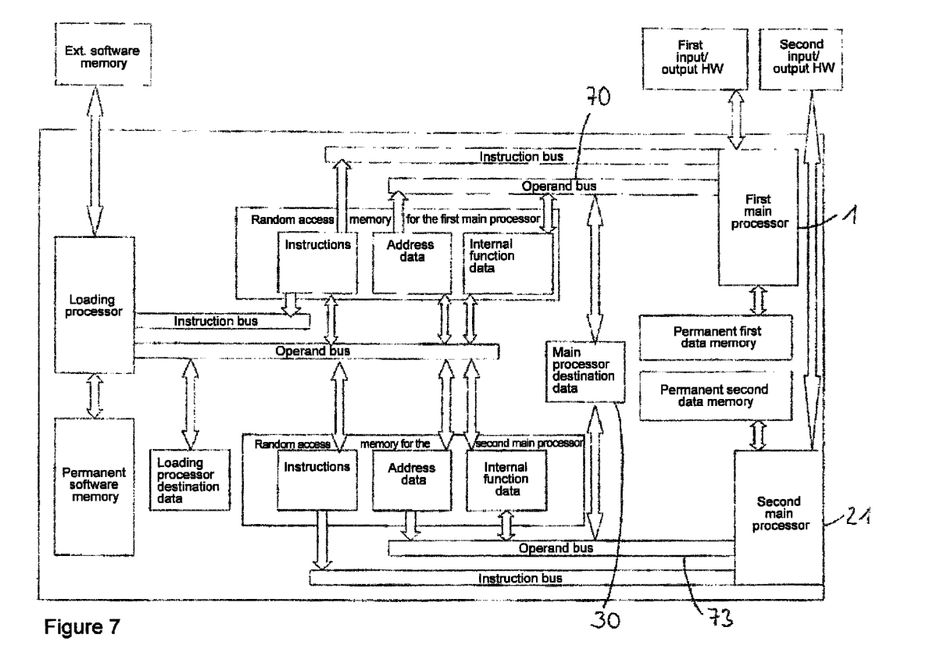
FIG. 7: shows a block diagram of an arrangement according to the invention with two main processors which are independent from one another, wherein the main processors have a common random access memory for main processor target data.

FIG. 7 shows a further embodiment whose block diagram essentially corresponds to that in FIG. 6. The difference lies in the fact that the random access memory for transfer data is omitted and only a common random access memory for target data of the main processors 30 is present, to which both main processors 1, 2 have bi-directional access via their respective operand buses 70, 73. This embodiment is a typical multiprocessor application.

In a further embodiment, which is not illustrated here, the target data for the loading processor can be represented within the internal function data; in this case, the target data of the loading processor data category can be dispensed with.

As a result of the arrangement of the function elements (processors, random access memories, permanent memories), the data processing system according to the system prevents any kind of malware from being able to be executed by processors. The principle of strict separation of data categories and processor tasks forms the basis of this. The data processing system according to the invention is, in principle, applicable on all scales, from mainframes and multiprocessor systems to mobile devices. Of course, the data processing system according to the invention is not limited to the described computer components and to the number of processors. Dependent on the given system design, the number of processors and the configuration of additional computer components (e.g. graphic processors) are freely selectable.

Due to the separate handling of data categories, it is necessary to correspondingly adapt the software for the data processing system according to the invention.

REFERENCE NUMBERS 1 main processor
2 random access memory
3 permanent data memory of the main processor
4 input/output hardware of the main processor
8 loading processor
9 permanent software memory
10 external software memory
11 instructions
12 address data
13 internal function data
14 main processor target data
15 loading processor target data
16 permanent media data memory
17 media data random access memory
18 media processor
19 external reading device
20 external loading device
21 second main processor
22 input/output hardware of the second main processor
23 permanent data memory of the second main processor
24 random access memory of the second main processor
25 instructions of the second random access memory
26 address data of the second random access memory
27 internal function data of the second random access memory
28 main processor target data of the second random access memory
29 random access memory for transfer data
30 main processor target data of the first and second main processors
40 input/output hardware of the media processor
50 bus system of the main processor
51 bus system of the loading processor
60 instruction bus of the main processor
70 operand bus of the main processor
61 instruction bus of the loading processor
71 operand bus of the loading processor
62 instruction bus of the media processor
72 operand bus of the media processor
63 instruction bus of the second main processor
73 operand bus of the second main processor

What is claimed is:

1. A data processing system including:
at least one main processor,
at least one permanent data memory,
at least one random access memory,
at least one input/output hardware unit connected to the at least one main processor,
at least one instruction bus, and
at least one operand bus,
wherein the at least one main processor communicates with the at least one random access memory via the at least one instruction bus and via the at least one operand bus and separately from these communicates bi-directionally with the at least one permanent data memory, the data processing system further including:
at least one loading processor,
at least one permanent software memory, and
at least one external software memory, wherein the at least one loading processor is configured to communicate bi-directionally with the at least one permanent software memory and the at least one external software memory, and
wherein the at least one loading processor is configured to communicate with the at least one random access memory via at least one instruction bus and via at least one operand bus separately and independently from the at least one main processor,
wherein the communication between the at least one main processor and the at least one random access memory takes place via the at least one instruction bus and the at least one operand bus,
wherein the communication between the at least one loading processor and the at least one random access memory takes place via the at least one instruction bus and the at least one operand bus, and
wherein both the communication between the at least one main processor and the at least one input/output hardware unit, as well as the at least one permanent data memory, and the communication between the at least one loading processor and the at least one external software memory, as well as the at least one permanent software memory, are controlled via access attributes.

2. The data processing system according to claim 1, wherein the data processing system includes a media processor which is configured to communicate bi-directionally via at least one instruction bus and at least one operand bus, respectively, with at least one separate random access memory for media data, wherein the media processor has its own permanent media data memory with which it communicates bi-directionally, and wherein the media processor is connected to its own input/output hardware unit.

3. The data processing system according to claim 1, wherein when more than one main processor is present, the main processors are configured to be used independently from one another, wherein each respective main processor with a respective memory for main processor target data that is permanently allocated to the respective main processor, and to which the other main processors have no access, and wherein all main processors have an additional common random access memory for common target data for controlled data transfer between the main processors.

4. The data processing system according to, claim 1, wherein when more than one main processor is present, the main processors are used independently from one another, wherein all main processors have a common random access memory for main processor target data with "read" and "write" access attributes.

5. The data processing system according to claim 1, further including an external reading device provided for reading software into the random access memory wherein the external reading device is configured to be controlled by the at least one loading processor, wherein the at least one loading processor forms an interface with the external reading device for software, this interface being physically set up in such a way that conventional reading devices for data carriers cannot be operated with it, so that unintentional loading of software is prevented.

6. An external reading device for reading software by the loading processor of the data processing system according to claim 5.

7. The data processing system according to claim 1, wherein the loading processor is arranged in an external loading device for loading software into the random access memory.

8. An external loading device for loading software into the random access memory of the data processing system according to claim 7.

9. A data processing system including:
 at least one main processor,
 at least one permanent data memory,
 at least one random access memory,
 at least one input/output hardware unit connected to the at least one main processor,
 at least one instruction bus, and
 at least one operand bus,
 wherein the at least one main processor communicates with the at least one random access memory via the at least one instruction bus and via the at least one operand bus and separately from these communicates bi-directionally with the at least one permanent data memory, the data processing system further including:
 at least one loading processor,
 at least one permanent software memory, and
 at least one external software memory, wherein the at least one loading processor is configured to communicate bi-directionally with the at least one permanent software memory and the at least one external software memory, and
 wherein the at least one loading processor is configured to communicate with the at least one random access memory via at least one instruction bus and via at least one operand bus separately and independently from the at least one main processor,
 wherein the communication between the at least one main processor and the at least one random access memory takes place via the at least one instruction bus and the at least one operand bus,
 wherein the communication between the at least one loading processor and the at least one random access memory takes place via the at least one instruction bus and the at least one operand bus,
 wherein both the communication between the at least one main processor and the at least one input/output hardware unit, as well as the at least one permanent data memory, and the communication between the at least one loading processor and the at least one external software memory, as well as the at least one permanent software memory, are controlled via access attributes, and
 wherein data in the at least one random access memory are categorised according to data categories, wherein different access attributes are defined as a function of the data categories, wherein there are main processor access attributes for the at least one main processor and loading processor access attributes for the at least one loading processor, and wherein data of the same data categories have the same main processor access attributes for access by the at least one main processor and the same loading processor access attributes for access by the at least one loading processor.

10. The data processing system according to claim 9, further including at least one separate random access memory provided for each data category.

11. The data processing system according to claim 9, wherein the following data categories are provided:
 address data,
 instructions,
 internal function data,
 target data of the at least one main processor
 target data of the at least one loading processor.

12. The data processing system according to claim 11, wherein the at least one main processor is configured to have:
 no access to the at least one permanent software memory,
 access to the at least one random access memory for instructions via the at least one instruction bus, which access is restricted to "read" access mode,
 access to the at least one random access memory for address data via the at least one operand bus, which access is restricted to "read" access mode,
 access to the internal function data via the at least one operand bus, which access is able to take place in "write" and/or "read" access modes, and
 access to the main processor target data via the at least one operand bus, which access is able to take place in "write" and/or "read" access modes, and
 no access to the loading processor target data of the at least one loading processor.

13. The data processing system according to claim 11, wherein the at least one loading processor is configured to have:
 access to the at least one external software memory, which access is restricted to "read" access mode, and
 access to the at least one permanent software memory, which access is able to take place in "write" and/or "read" access modes,
 access to the at least one random access memory for instructions via the at least one operand bus, which access is restricted to "write" access mode,
 access to the at least one random access memory for instructions via the at least one instruction bus, which access is restricted to "read" access mode,
 access to the at least one random access memory for the loading processor target data, address data and internal function data via the at least one operand bus, which access is able to take place in "write" and/or "read" access modes, and
 no access to the main processor target data of the at least one main processor.

14. The data processing system according to claim 9, wherein the data categories' internal function data and loading processor target data are allocated to a common physical random access memory.

15. A storage device containing a computer program configured to process outputs from program generation tools, wherein the processing takes place in such a way that the data categories are created and produced as data segments that are enabled to be processed by the data processing system according to claim 9.

16. A storage device containing a computer program configured to process programs which are executable in the Von Neumann architecture and/or Harvard architecture, wherein the processing takes place in such a way that the data categories are created and produced as data segments that are enabled to be processed by the data processing system according to claim 9.

\* \* \* \* \*